(12) United States Patent
Endo et al.

(10) Patent No.: US 7,737,600 B2
(45) Date of Patent: Jun. 15, 2010

(54) MOTOR GENERATOR AND AUTOMOBILE CARRYING THE SAME

(75) Inventors: Yasuhiro Endo, Okazaki (JP); Ryoji Mizutani, Aichi-ken (JP); Kazutaka Tatematsu, Nagoya (JP); Kenji Harada, Aichi-ken (JP); Toshiya Yamaguchi, Aichi-ken (JP); Eisuke Hoshina, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 383 days.

(21) Appl. No.: 11/666,460

(22) PCT Filed: Oct. 28, 2005

(86) PCT No.: PCT/JP2005/020257

§ 371 (c)(1),
(2), (4) Date: Jun. 19, 2007

(87) PCT Pub. No.: WO2006/046782

PCT Pub. Date: May 4, 2006

(65) Prior Publication Data
US 2008/0001494 A1 Jan. 3, 2008

(30) Foreign Application Priority Data

Oct. 29, 2004 (JP) ............................ 2004-316363
Apr. 25, 2005 (JP) ............................ 2005-126715

(51) Int. Cl.
*H02K 1/06* (2006.01)
(52) U.S. Cl. ........................... 310/216.111; 310/254.1; 310/216.055; 310/216.074
(58) Field of Classification Search .................. 310/216, 310/254
See application file for complete search history.

(56) References Cited

U.S. PATENT DOCUMENTS

| 4,837,474 A | * | 6/1989 | Petersen et al. ....... 310/216.021 |
| 5,822,150 A | | 10/1998 | Kelsic |
| 5,854,526 A | * | 12/1998 | Sakamoto .................... 310/254 |
| 6,226,856 B1 | * | 5/2001 | Kazama et al. ................ 29/596 |

(Continued)

FOREIGN PATENT DOCUMENTS

CN       1295732 A       5/2001

(Continued)

*Primary Examiner*—Quyen Leung
*Assistant Examiner*—Alex W Mok
(74) *Attorney, Agent, or Firm*—Kenyon & Kenyon LLP

(57) ABSTRACT

In a stator core composed of a powder compacted magnetic body, a yoke part comprises a protrusion protruding from an axial end face of a tooth. The tooth has an axial length gradually decreases towards an outside along the radial direction of the stator core, and a circumferential length which gradually increases towards an outside along the radial direction of the stator core. In one of the cross sections of stator core perpendicular to a radial direction, the height difference between axial end faces of the yoke part and the tooth is substantially equal to an axial length of a coil end part. Further, a cross-sectional area of the tooth perpendicular to the radial direction is substantially maintained constant along the radial direction, and the cross-sectional area is secured at a junction between the tooth and the yoke part, while half of the cross-sectional area is secured in a circumferential cross section of the yoke part.

22 Claims, 8 Drawing Sheets

U.S. PATENT DOCUMENTS

| | | |
|---|---|---|
| 6,472,792 B1 | 10/2002 | Jack et al. |
| 7,227,290 B2 * | 6/2007 | Yamamoto et al. .......... 310/216 |
| 2003/0006663 A1 * | 1/2003 | Hsu ........................... 310/194 |

FOREIGN PATENT DOCUMENTS

| | | |
|---|---|---|
| DE | 103 48 187 A1 | 5/2004 |
| EP | 1 322 022 A | 6/2003 |
| JP | 58204746 A * | 11/1983 |
| JP | 09-019095 | 1/1997 |
| JP | 10-322940 A | 12/1998 |
| JP | 2001-025183 A | 1/2001 |
| JP | 2001-178031 A | 6/2001 |
| JP | 2002-369418 A | 12/2002 |
| JP | 2002-544753 A | 12/2002 |
| JP | 2003-235183 A | 8/2003 |
| WO | WO 99/50949 A1 | 10/1999 |
| WO | WO 2004/004092 A1 | 1/2004 |
| WO | WO 2004/098023 A1 | 11/2004 |

* cited by examiner (A)　　　　　　　　　(B)

(a)     (b)

PRIOR ART

MOTOR GENERATOR AND AUTOMOBILE CARRYING THE SAME

This is a 371 application of PCT/JP2005/020257 filed on 28 Oct. 2005, claiming priority to Japanese Applications No. 2004-316363 filed on 29 Oct. 2004 and No. 2005-126715 filed 25 Apr. 2005, the contents of which are incorporated herein by reference.

FIELD OF THE INVENTION

The present invention relates to a motor generator composed of a stationary part (hereinafter also referred to as a stator) and a rotating part (hereinafter also referred to as a rotor) and an automobile having the motor generator mounted therein, and, more particularly, to a stator of a motor generator.

BACKGROUND OF THE INVENTION

In a motor generator composed of a stator and a rotor, the stator consists of a stator core having a plurality of slots formed thereto, and coils wound around comb teeth (hereinafter also referred to simply as "teeth") formed between the slots. On the other hand, the rotor consists of a rotor core, magnets bearing magnetic force, and a shaft working as an axis of rotation.

When power is provided to the coil in the above-described structure, a magnetic field is generated. Based on the generated magnetic field, magnetic flux flows form between the rotor and the stator, thereby providing a rotary force to the rotor. In an automobile in which the motor generator is installed as a power source, for example, the wheels are driven by this rotary force.

Regarding a stator, a great number of stator structures designed to improve an area ratio of a cross-sectional area of a slot to a cross-sectional area occupied by a coil (hereinafter also referred to as a space factor) have conventionally been disclosed (for example, refer to JP 2002-369418 A and JP 2002-544753 A).

FIG. 14 is a diagram showing a stator structure in a motor generator disclosed in JP 2002-369418 A, for example.

FIG. 14(A) shows a state in which winding 52 is wound around one pole of a multilayer core 51 constituting a part of a stator, and FIG. 14(B) shows a horizontal cross section view of FIG. 14(A).

The multilayer core 51 is formed by laminating a predetermined number of flat rolled magnetic steel sheets and strips, and includes spaces formed by a teeth part 53 and a yoke part 54 on both sides of the teeth part 53 work as slot parts 55 used for arranging the winding 52.

The multilayer core 51 is provided with an insulation cap 56 to cover an inner surface of the slot part 55 after a core end member 57 which will be described below is attached to the multilayer core 51. A predetermined number of turns of the winding 52 are wound around the perimeter of the insulation cap 56, thereby forming the state shown in FIG. 14(A).

Referring to FIG. 14(B), a width dimension W of the teeth part 53 is established in such a manner that both end faces are tapered so as to be gradually narrowed from an outer stator circumference toward an inner stator circumference. In this manner, the projected shapes of the slot parts 55 provided on both sides of the teeth part 53 are made rectangular or parallelogramatic.

FIG. 14(C) shows a state in which the winding 52 and the insulation cap 56 shown in (A) of the same figure are removed, and 14(D) shows a diagram showing (C) of the same figure viewed along the direction of an arrow D.

Referring to FIG. 14(C), core end members 57 having an outline shape substantially identical to a projected shape of the teeth part 53 are respectively attached to both ends of the lamination core 51 in a lamination direction. The core end members 57 are formed of a magnetic powder molded body, and the outer faces of winding pressure receiving surfaces 57a formed so as to extend in a step-wise manner from the outer stator circumference toward the inner circumference (refer to FIG. 14(D)).

In the above-described structure, when the lamination core 51 functions as a part of a motor generator, magnetic fluxes pass through the teeth part 53. Then, at an end of the teeth part 53 on an inner stator circumference side, a magnetic flux density becomes higher due to the smaller width dimension W, which may cause the magnetic fluxes to be saturated. With this in view, the core end members 57 attached to the both ends of the lamination core 51 in the steel-sheet lamination direction are caused to function as a magnetic path. However, because the core end members 57 have a different magnetic property depending on material, equivalent cross-sectional areas in the inner circumference side and the outer circumference side and a central portion along a radial direction are found, and established so as to have equal values between each other.

According to such a structure as described above, because dead space in the slot part 55 is minimized, thereby increasing the space factor of the winding 52 in the slot part 55, a compact and high-power motor generator can be realized.

However, in the conventional stator structure shown in FIG. 14, while the space factor of the winding 52 is increased, a part wound by the winding 52 formed along an axial direction (a coil end part) is formed in a shape protruding from the yoke part 54 due to the core end members 57 attached to the both axial ends of the teeth part 53 as can be seen from FIG. 14(D). Accordingly, mountability of motor generators comprising the stator is problematic.

Further, although the teeth part is three-dimensionally expanded along the axial direction by means of the core end members 57, the yoke part 54 remains a two-dimensional construction defined in circumferential and radial directions, which results in inevitable thickening of the yoke part 54 in the radial direction for keeping flux linkage that passes through the teeth part. Accordingly, the possibility of reducing body sizes has been limited.

Still further, because the axial length of the stator is increased due to the protruded coil end part in the conventional stator structure, it has been difficult to downsize the total axis length including the winding 52.

Therefore, the present invention, which is directed to overcome one or more problems set forth above, has an advantage to provide a compact and high-power motor generator having superior mountability, and an automobile equipped with the motor generator.

SUMMARY OF THE INVENTION

According to the present invention, a motor generator comprises a stator formed in a hollow cylindrical shape and a rotor rotatably mounted with respect to the stator. The stator includes a stator core consisting of a yoke part which is annularly extended and a teeth part which has a plurality of teeth annularly disposed on an inner circumference side of the yoke part so as to point inward along a radial direction, and a coil wound around each of the plurality of teeth. The yoke part has a protrusion protruding from each axial end face of the plurality of teeth towards an outside along an axial direction. Each of the plurality of teeth has an axial length which is gradually decreased towards a yoke part side being outside along the radial direction, and a circumferential length which is gradually increased towards yoke part side being an outside along the radial direction.

According to the present invention, a motor generator comprises a stator formed in a hollow cylindrical shape and a rotor rotatably mounted with respect to the stator. The stator includes a stator core consisting of a yoke part which is annularly extended and a teeth part which has a plurality of teeth annularly disposed on an inner circumference side of the yoke part so as to point inward along a radial direction, and a coil wound around each of the plurality of teeth. The yoke part has a protrusion protruding from each axial end face of the plurality of teeth towards an outside along an axial direction. Each of the plurality of teeth has an axial length which is longer than its circumferential length at an inner circumferential end of the stator core, and the circumferential length which is longer than the axial length at a yoke part side which is an outer circumferential end of the stator core.

Preferably, the axial length of the protrusion is substantially equal to the axial length of a coil end part of the coil at its outermost circumference.

Preferably, the stator has, in any one of cross sections perpendicular to the radial direction, a gap between the axial end face of the yoke part and the axial end face of the tooth is substantially equal to the axial length of the coil end part.

Preferably, each of the plurality of teeth has cross sections perpendicular to the radial direction which are substantially equal in areas along the radial direction.

Preferably, a cross section of the yoke part perpendicular to the circumferential direction has an area which is one-half the area of the cross section of the tooth perpendicular to the radial direction, or greater.

Preferably, a cross-sectional area of a junction between the yoke part and each of the plurality of teeth is greater than or equal to the area of the cross section of each tooth perpendicular to the radial direction.

Preferably, each of the plurality of teeth has, in cross sections perpendicular to the radial direction, corners which are formed with curved geometries.

Preferably, each of the plurality of teeth has the axial end faces formed with a curved geometry.

Preferably, the stator core is a molded body constituting a magnetic dust core.

Preferably, the stator is composed of at least two molded bodies constituting the magnetic dust cores divided along the axial direction.

Preferably, the at least two molded bodies constituting the magnetic dust core comprise a first molded body placed at one axial end and a second molded body placed at the other axial end. At least one of the first and second molded bodies has a shape identical to those of the first or second molded bodies used for a plurality of motor generators which having different axial length of the stator cores.

According to the present invention, an automobile comprises wheels and a plurality of motor generators according to any one of the above-described features, each of the plurality of motor generators driving the wheels.

According to the present invention, an automobile comprises wheels and a motor generator according to any one of the above-described features for driving the wheels.

According to the present invention, because the the yoke part of the stator protrudes from the teeth part towards an outside along the axial direction, a compact and high-power motor generator that exhibits superior mountability after the coil is wound can be realized.

Further, when the stator core is formed of a plurality of the magnetic dust cores joined to each other along the axial direction, a motor generator having a broader range of output performances can be realized by way of a simple and low-cost molding process.

DETAILED DESCRIPTION

Figure 1:
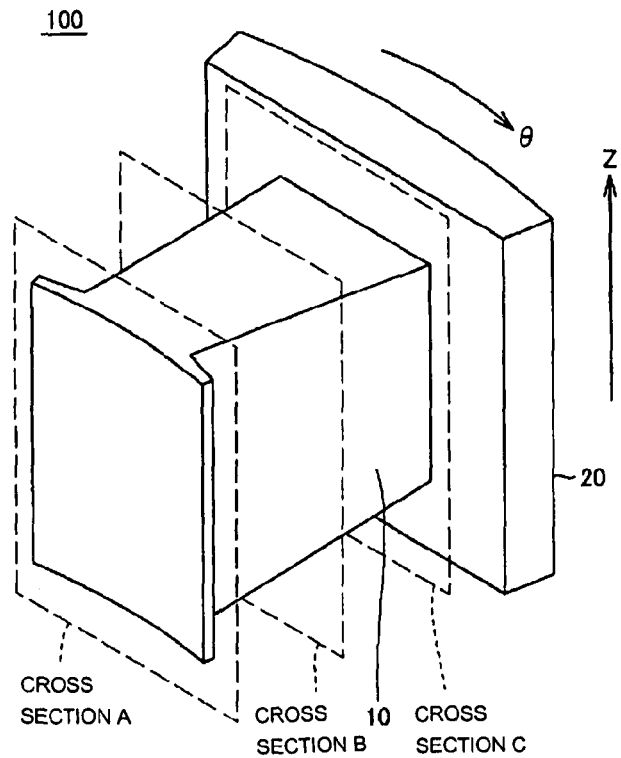
FIG. 1 is a perspective view showing one pole of a stator core in a stator of a motor generator according to an embodiment of the present invention.

Referring to drawings, preferred embodiments of the present invention will be described in detail bellow. It should be noted that identical reference characters in the drawings represent identical or equivalent components.

FIG. 1 is a perspective view showing one pole of a stator core in a stator of a motor generator according to an embodiment of this invention. Although it is not illustrated, the stator core is, on the whole, formed in a hollow cylindrical shape in which a number, which is equal to the number of poles of a motor generator, of poles of the stator core 100 in FIG. 1 are annularly arranged. Further, the stator core includes an annular yoke part, a teeth part having a predetermined number of teeth arranged in an annular form on an inner circumference side of the yoke part so as to direct to a radial inside, and a predetermined number of slots formed between adjacent teeth and extending along the axial direction. The numbers of the teeth and the slots match the number of poles of the motor generator.

Referring to FIG. 1, the stator core 100 has, in any one of the poles, a roughly T-shaped configuration formed by a yoke part 20 and a tooth 10. The stator core 100 is composed of a magnetic core (hereinafter, also referred to as a magnetic dust core) obtained through compression molding of a magnetic powder using a molding die, in which the yoke part 20 and the tooth 10 are integrally formed. A forming process of the stator core 100 will be described in detail later.

On both sides of the tooth 10 in a circumferential direction (corresponding to a θ direction), slots are respectively formed between the tooth 10 and an adjacent tooth 10 (not illustrated). A coil which is not illustrated is inserted into the slots which are adjacent via the tooth 10 sandwiched in-between, so as to be wound and fixed around each of the teeth 10.

In this embodiment, it is a first feature of the stator core 100 that the length in the axial direction (corresponding to a z direction) differs between the yoke part 20 and the tooth 10. More specifically, as shown in FIG. 1, the yoke part 20 has protrusions respectively protruding from both axial end faces of the tooth 10 toward the axial outside. Thus, the yoke part 20 is longer than the tooth 10 by the length of the protrusions in the axial direction. In this point, the stator structure according to the present invention differs from conventional stator structures in which the yoke part and the teeth part are formed so as to have the same length in the axial direction.

Further, the stator core 100 according to the present invention has a second feature that the tooth 10 has a modified cross section in which cross sections of the tooth 10 perpendicular to the radial direction gradually changes along the radial direction. For example, in the tooth 10 of FIG. 1, an innermost cross section (corresponding to a cross section A in the figure), an outermost cross section (corresponding to a cross section C in the figure), and a middle cross section situated between the innermost and outermost cross sections (corresponding to a cross section B in the figure) have different shapes. It should be noted that the radial cross sections including the cross sections A to C satisfy a relationship that the radial cross sections are equal in area while varying in aspect ratio. Because the stator core 100 is composed of the magnetic dust core, the above features can be easily realized by making full use of good formability of the magnetic dust core.

Figure 2:
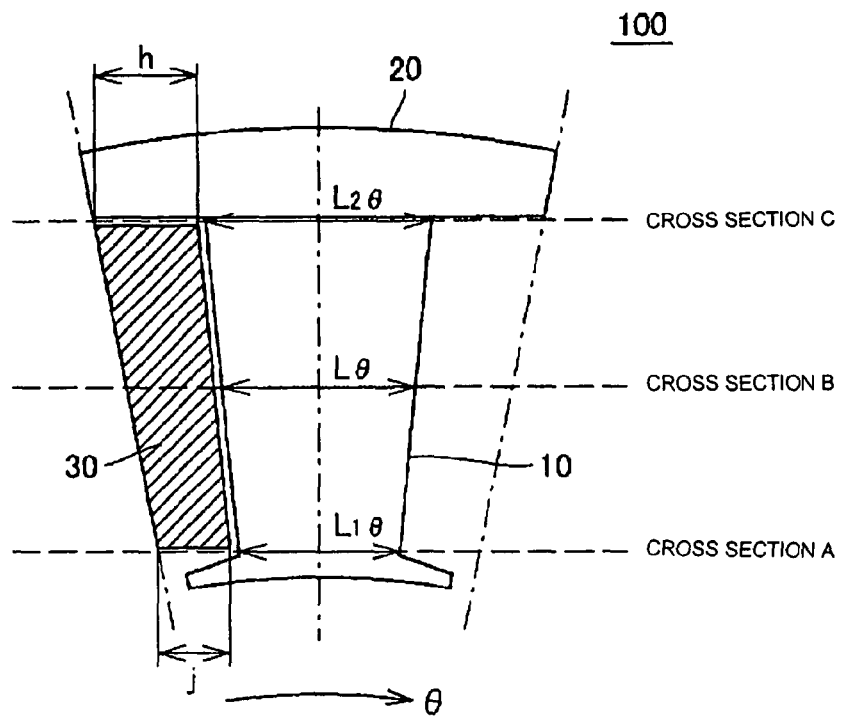
FIG. 2 is a circumferential cross-sectional view of the stator core in FIG. 1.

FIG. 2 is a circumferential cross section view of the stator core 100 of FIG. 1.

Referring to FIG. 2, the tooth 10 in the stator core 100 has a substantially fan-shaped cross section in which its circumferential length is gradually shortened towards an inner side along the radial direction. More specifically, when the circumferential lengths of the cross sections A to C along the radial direction shown in FIG. 1 are defined as $L_{1\theta}$, $L_\theta$, and $L_{2\theta}$, respectively, the cross sections A to C satisfy a relationship of $L_{1\theta} < L_\theta < L_{2\theta}$.

When the cross section of the tooth 10 perpendicular to the axial direction is formed in such a fan shape, the slots 30 formed on both sides of the tooth 10 have, as shown by a hatched region in the figure, substantially rectangular shapes, respectively. In other words, a circumferential width h of the cross section C is substantially equal to a circumferential width j of the cross section A in the hatched region, which yields an increase of the coil space factor in the slots 30. More specifically, when a rectangular copper wire, for example, is used for a coil, the coil can be systematically arranged in the slots 30, to thereby enable formation of a closely-packed coil, which can in turn yield a further increase of the space factor.

Figure 3:
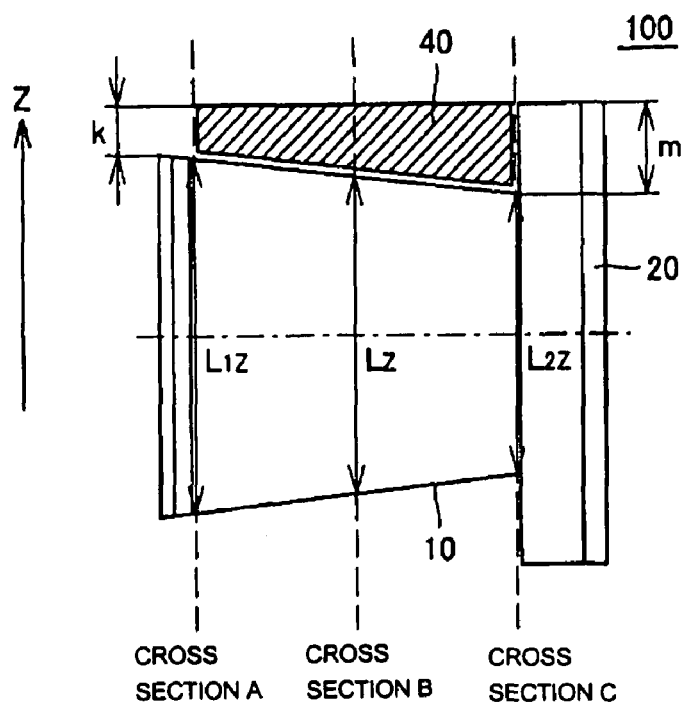
FIG. 3 is an axial cross-sectional view of the stator core of FIG. 1.

FIG. 3 is an axial cross section view of the stator core 100 of FIG. 1.

As can be seen from FIG. 3, the tooth 10 has an axial length that gradually changes along the radial direction. More specifically, the axial length is gradually shortened toward the outer circumference side of the stator. Taking the axial lengths of the cross sections A to C along the radial direction shown in FIG. 1 as $L_{1z}$, $L_z$, and $L_{2z}$, respectively, the lengths satisfy a relationship of $L_{1z} > L_z > L_{2z}$. In addition, it is also understood that even the greatest axial length $L_{1z}$ of the cross section A is shorter than the axial length of the yoke part 20.

Figure 14:
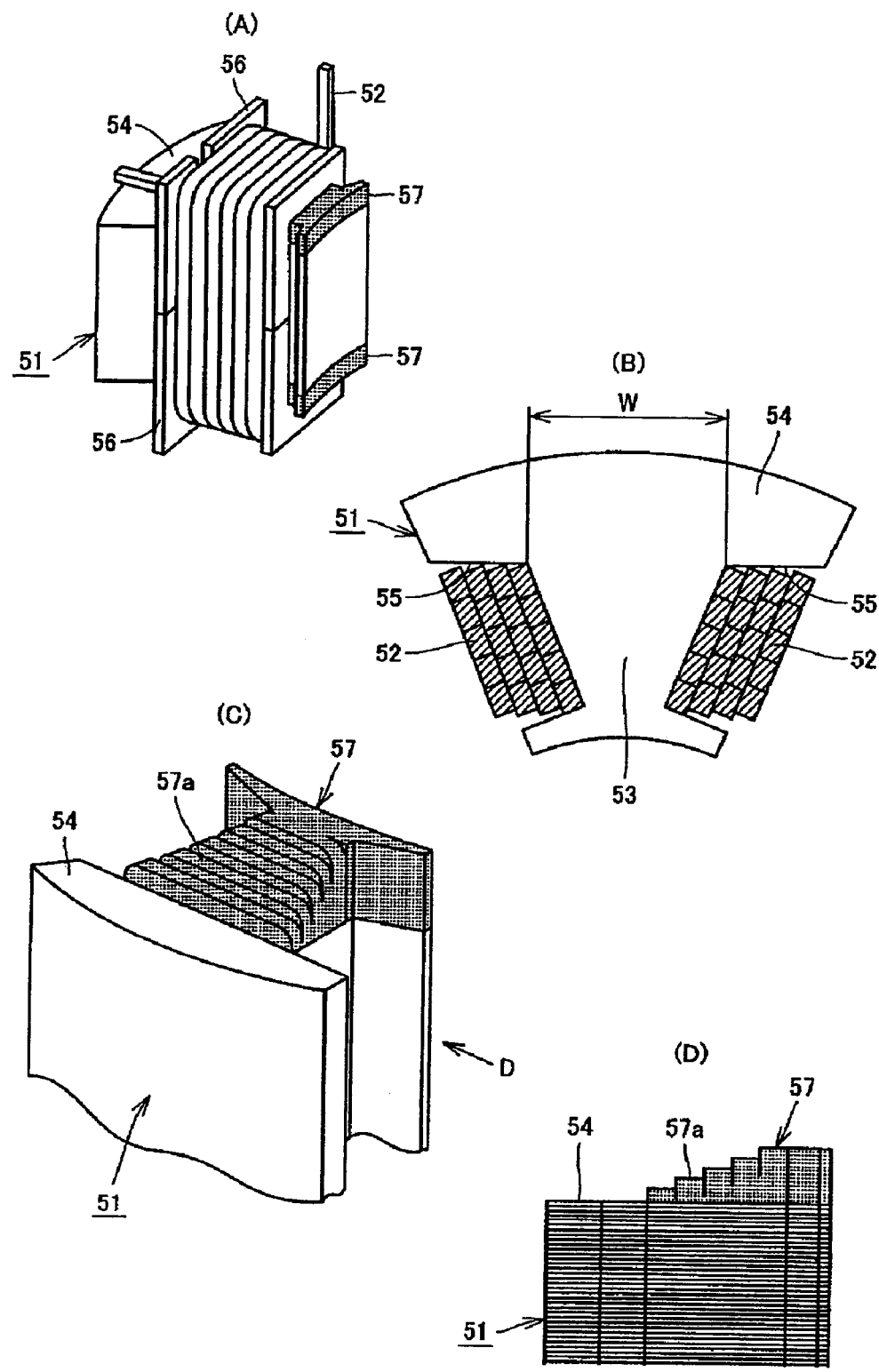
FIG. 14 is a diagram showing a structure of a stator in a motor generator disclosed in a prior art.

Here, it can be understood from FIGS. 2 and 3 that the tooth 10 has circumferential and axial lengths that satisfy the relationships of $L_{1\theta} < L_\theta < L_{2\theta}$ and $L_{1z} > L_z > L_{2z}$ in the cross sections A to C. In other words, from the inner circumference side to the outer circumference side of the stator, the tooth 10 is increased with respect to the circumferential length while being decreased with respect to the axial length. The invention of the present application differs from the conventional stator structure shown in FIG. 14 in which a given axial length of the teeth part 53 is maintained in that the shape of the tooth 10 is changed not only along the circumferential direction but also along the axial direction, and in that, unlike the conventional stator structure shown in FIG. 14 in which the axial length of the yoke part 54 is shorter than the axial length of the teeth part (=the teeth part 54+the core end member 57), the axial length of the yoke part 20 is still greater than a maximum value of the axial length of the tooth 10.

Still further, the yoke part 20 joined to the tooth 10 at the outermost circumference side of the tooth 10 has the protrusions respectively protruding from each axial end face of the tooth 10 toward the axial outside as described above. The axial length m of the protrusions is equivalent to a height difference between the axial end face of the yoke part 20 and the end face of the tooth 10 at the outermost circumference side of the tooth 10. A height difference equal to the axial length k can also be found between the axial end face of the yoke part 20 and the end face of the tooth 10 at the innermost circumference side.

Here, when a coil is wound around the tooth 10, both ends of the coil protruding from the slots 30 along the axial direction constitute coil end parts 40. In the conventional stator structure in which the axial length of the teeth part (including the core end member) is longer than that of the yoke part, the coil end parts 40 are formed in a shape projecting from both axial end faces of the stator core impair mountability as described above.

Accordingly, in the present embodiment, the shapes of the tooth 10 and the yoke part 20 are defined in such a manner that the height difference between each axial end face of the coil end parts 40 and the axial end face of the yoke part 20 is removed to make both end faces be substantially coplanar as shown in FIG. 3.

More specifically, coil winding space in the slots 30 has, as shown in the hatched region of FIG. 2, the circumferential widths j and h in the cross sections A and C, respectively. For this reason, when the coil is wound, the coil end parts 40 respectively have axial heights substantially equal to the widths j and h in the cross sections A and C. Assuming that the axial end face of the tooth 10 has a height equal to that of the axial end face of the yoke part 20, the coil end parts 40 will respectively protrude from the stator core 100 by the heights j and h in the cross sections A and C.

Here, to eliminate the protrusions, the stator core 100 according to the present embodiment is formed in such a manner that the height difference k between the axial end face of the yoke part 20 and the axial end face of the tooth 10 in the cross section A becomes substantially equal to the axial height j of the coil end part 40 in the cross section A. In addition, the height difference m between the axial end face of the yoke part 20 and the axial end face of the tooth 10 in the cross section C (=the axial length of the protrusion in the yoke part 20) is defined so as to be substantially equal to the height difference h of the coil end part 40 in the cross section C.

In such a structure, because the coil end part 40 formed upon winding the coil around the tooth 10 is almost contained within a body size of the stator core 100 without protruding therefrom in the axial direction, the mountability of a motor generator can be improved.

In the motor generator according to the present embodiment, as described above, provision of the protrusions to the yoke part 20 in the stator core 100 and formation of the modified cross sections of the tooth 10 along the radial direction contribute to the improved mountability of the motor generator in which the high space factor of the coil is maintained.

Because the increased space factor of the coil in the slots 30 leads to an increase of the magnetic flux generated inside the tooth 10, a greater output torque would be expected. However, when the amount of ineffective magnetic flux is increased due to saturation of the magnetic flux or other causes in the stator core 100, torque variation or iron loss is introduced, which causes degrades, rather than improves, control performance of the motor generator.

With this in view, in this embodiment, the shape of the tooth 10 is defined in such a manner that the area of the cross sections of the tooth 10 perpendicular to the radial direction is maintained constant while changing the aspect ratio of the cross sections as described above. Further, the shape of the yoke part 20 is constructed taking into account reduction of leakage flux, which will be described in detail below.

Figure 4:
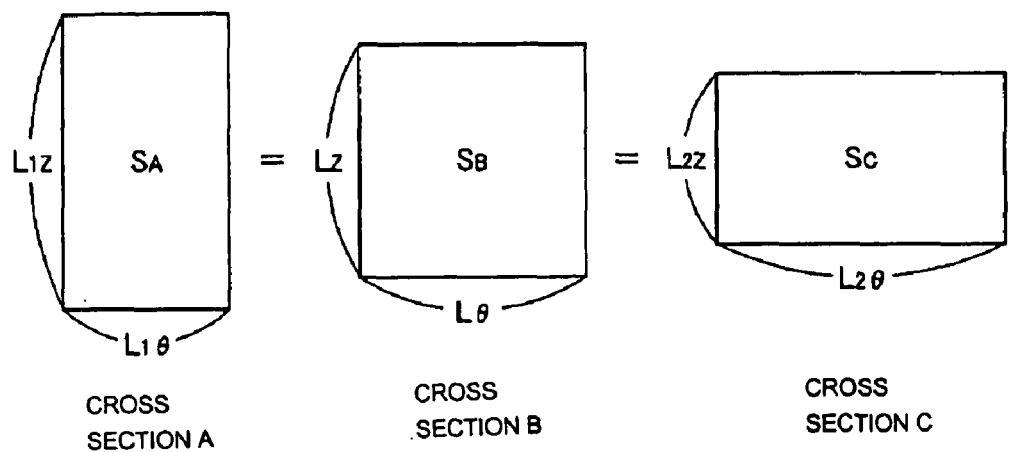
FIG. 4 is a drawing for explaining cross sections of a tooth in the stator core of FIG. 1 perpendicular to a radial direction.

FIG. 4 is a diagram for explaining the cross sections of the tooth 10 perpendicular to the radial direction in the stator core 100 shown in FIG. 1.

Referring to FIG. 4, all of the cross sections A to C of the tooth 10 of FIG. 1 are, as described above, of rectangular shape in which axial and circumferential sides have the relationships of $L_{1Z} > L_Z > L_{2Z}$ and $L_{1\theta} < L_\theta < L_{2\theta}$.

Further, when cross sectional areas of the cross sections A to C are defined as $S_A$, $S_B$, and $S_C$, respectively, the cross sections A to C have a relationship of $S_A = S_B = S_C$. In other words, in the shape of the tooth 10, the ratio between the axial side and the circumferential side (i.e. the aspect ratio) is gradually changed while maintaining the constant area of the cross sections of the tooth 10 perpendicular to the radial direction. In particular, in the invention of the present application, the cross sections A and C may be designed so as to have an aspect ratio which is inverted in the relationship between the cross sections A and C while maintaining their areas constant.

Here, the reason that the areas of the cross sections of the tooth 10 perpendicular to the radial direction are maintained constant will be described below.

The magnetic flux produced in the stator core 100 pass through the inside of the tooth 10 along the radial direction (a direction perpendicular to the cross sections A to C of the tooth 10). Here, when local flux saturation occurs as a result of flux concentration inside the tooth 10, effective magnetic fluxes that link the coil are reduced, resulting in the occurrence of ineffective magnetic fluxes. The ineffective magnetic fluxes cause torque variations referred to as "cogging torques", or cause iron loss to occur in the motor generator. Because cogging torque or iron loss lead not only to reduced motor efficiency, but also to noise or vibration, it becomes necessary to ensure uniform distribution of magnetic flux density in the stator core 100 for suppressing the level of flux saturation. Hence, when the area of the cross sections of the tooth 10 perpendicular to the radial direction is rendered uniform as was described while referring to FIG. 4, uniform distribution of magnetic flux density in the tooth 10 can be ensured, to thereby suppress the occurrence of the cogging torque or the iron loss.

Figure 5:
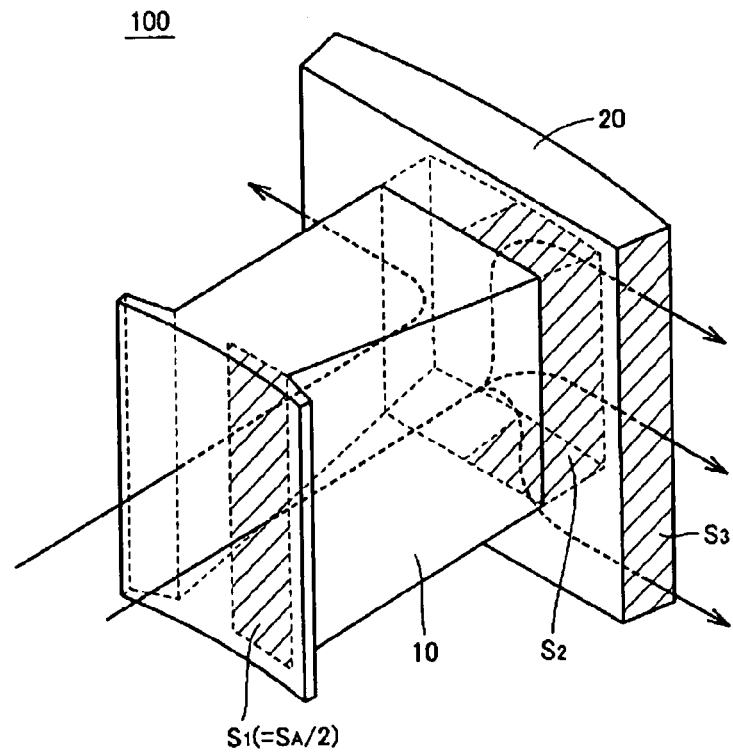
FIG. 5 is an explanatory diagram showing flows of magnetic fluxes inside the stator core.

FIG. 5 is an explanatory diagram showing magnetic flux flows in the stator core 100.

Referring to FIG. 5, the magnetic flux having passed through the inside of the tooth 10 along the radial direction flows, as indicated by the arrows, via a joint surface between the tooth 10 and the yoke part 20 (hereinafter simply referred to as the joint surface) into the yoke part 20. After flowing into the yoke part 20, the magnetic flux travels through the inside of the yoke part 20 towards mutually opposite directions along the circumferential direction.

Here, it is known that when leakage flux occurs in such a magnetic flux path starting from the tooth 10 through the joint surface and reaching the yoke part 20, the above-described cogging torque is produced. In order to prevent the occurrence of leakage flux, it is essential that cross-sectional areas in the magnetic flux path through which the magnetic flux flows not be reduced. For this reason, it is necessary that the area of the joint surface be greater than or equal to the area of the cross sections of the tooth 10 perpendicular to the radial direction, and further necessary that the area of the cross section of the yoke part 20 perpendicular to the circumferential direction be at least one-half of the cross section of the tooth 10 perpendicular to the radial direction.

Specifically, when just either one of the one-half area of the joint surface (corresponding to the area of hatched region $S_2$) or the cross-sectional area of the yoke part 20 perpendicular to the circumferential direction (corresponding to the area of hatched region $S_3$) becomes smaller than the cross-sectional area $S_1$ of the tooth 10 perpendicular to the radial direction (=one-half of the whole area $S_A$), leakage flux occurs in that area. It should be noted that the above-described one half is defined because the magnetic flux having passed through the tooth 10 is directed to two opposite directions along the circumferential direction in the yoke part 20.

In other words, in the present embodiment, the shape of the yoke part 20 is determined so as to satisfy the relationship of $S_1 \leq S_2$, $S_3$, in addition to the above-described relationship with respect to the coil end part 40.

As described above, according to the present invention, a compact and high-power motor generator whose mountability is improved can be realized by provision of the protrusions on the yoke part 20 and formation of the modified cross sections of the tooth 10. Here, because the shapes of the tooth 10 and the yoke part 20 are determined taking into account the reduction of ineffective magnetic fluxes, efficiency degradation and the occurrence of noise and vibration in the motor generator can be prevented.

Next, an example configuration of an actual stator core in which the stator core according to the present invention is employed as a basic structure will be described.

Figure 6:
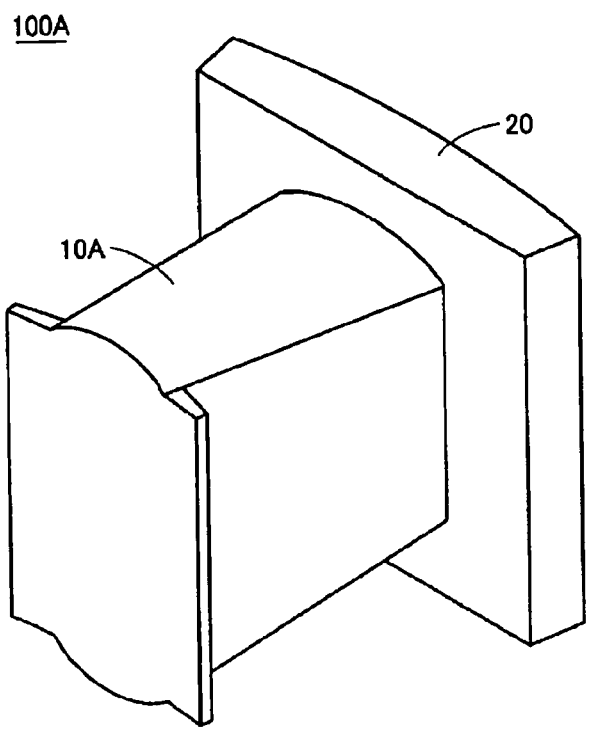
FIG. 6 is a perspective view showing another configuration example of the stator core shown in FIG. 1.

FIG. 6 is a perspective view showing another example of the structure of the stator core 100 shown in FIG. 1. Similarly as in FIG. 1, the structure of one pole of a stator core 100A is shown in FIG. 6.

The stator core 100A has a tooth 10A modified from the tooth 10 in the stator core 100 of FIG. 1. Specifically, the stator core 100A is characterized in that both axial end faces of the tooth 10A have a curved geometry. Because the basic constitutions of the tooth 10A and the yoke part 20 are similar to those of the tooth 10 and the yoke part 20 in FIG. 1, detailed descriptions of their constitutions are not repeated.

Effects obtained from the curved geometry of the axial end faces of the tooth 10A will be described below.

The stator core 100A is formed in a manufacturing process in which, after a magnetic powder is formed by means of pressure forming into a molded body, insulation treatment is applied to the molded body in a region on which a coil is wound. The insulation treatment is performed by forming an insulation film on a surface of the molded body through powder coating, dipping, or oxidation treatment. In this process, an insulation film having a predetermined film thickness is also coated on the tooth 10A. The coil is wound around the tooth 10 on top of the insulation film.

Here, when the axial end faces of a tooth are of a flat geometry similar to the tooth 10, the insulation film is likely to deteriorate at the corners of the axial end faces as a result of local coil stresses. On the other hand, in the tooth 10A having axial end faces formed with the curved geometry, because the coil is wound along the curved surface, the local stress exerted from the coil on the insulation film is relieved, to thereby enable prevention of the deterioration.

In addition, the tooth 10A produces an effect that the film thickness of the insulation film covering a tooth surface can be rendered more uniform. When the cross section perpendicular to the radial direction has a rectangular shape, the film thickness might be oversized or undersized at the corners depending on a method for insulation treatment. More specifically, the corners are likely to have insufficient film thickness when the film is formed through a dipping process, while the corners are likely to be too thick when formed through electrostatic coating. Therefore, because the corners are rounded as achieved in the tooth 10A when the axial end faces are formed into the curved geometry, uneven film thickness in the insulation film can be prevented, thereby facilitating improvement in quality.

Figure 7:
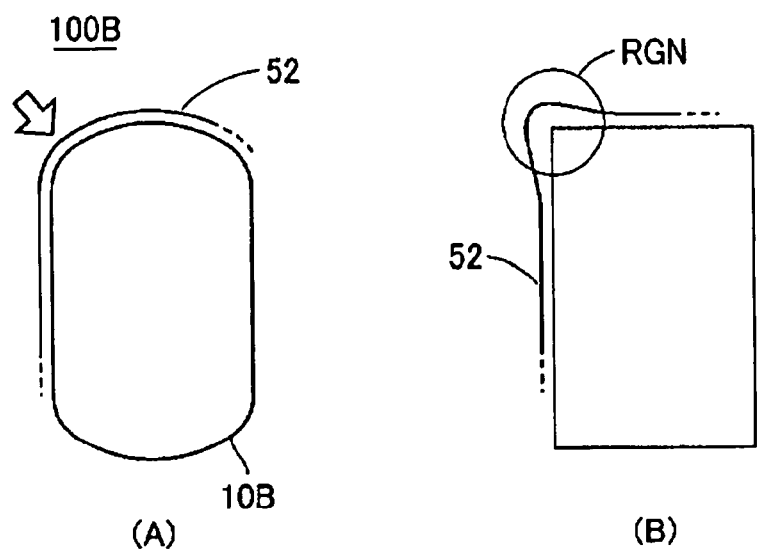
FIG. 7 shows a cross-sectional view of the tooth perpendicular to the radial direction for explaining a modification example of the stator core of FIG. 6 (FIG. 7(A)), and shows a cross-sectional view of a tooth perpendicular to the radial direction in a general stator core (FIG. 7(B)).

In addition, when the stator core 100A is formed, as shown in FIG. 7(A), in the curved geometry with respect to all the cross sections of a tooth 10B perpendicular to the radial direction, the film thickness of the insulation film can be made uniform, and effects as described below can be obtained in connection with the coil space factor.

FIG. 7(A) is a cross-sectional view of a tooth perpendicular to the radial direction for explaining a modified example of the stator core shown in FIG. 6, while FIG. 7(B) is a cross-sectional view of a tooth perpendicular to the radial direction in a general stator core.

The tooth 10B in the modified example is substantially oval in cross section as illustrated in FIG. 7(A), in which corners appearing in the cross section shown in FIG. 7(B) are not shown.

In general, during coil winding, a wire 52 is wound around a tooth while exerting a predetermined tension to prevent deflection or torsion of the wire 52. However, in a general stator core, because the cross section of the tooth perpendicular to the radial direction has a rectangular geometry, a loop of the wire 52 is thickened at the corners as shown in a region RGN of FIG. 7(B). The thickened loop contributes to a reduced coil space factor in addition to redundancy of the circumferential length of the wire 52.

As shown in FIG. 7(A), when the entire surface of the tooth 10B is formed in the curved geometry, the wire 52 can be wound around the tooth 10B with a high degree of efficiency, to thereby yield an increase of the coil space factor. In addition, because the coil is obtained in a closely-packed form leading to downsizing of the coil end part, the body size of the motor generator can be effectively slimmed. Further, because the stress exerted from the wire 52 on the insulation film covering the tooth 10B is relieved, deterioration of the insulation film can be prevented, thereby ensuring high reliability.

Although, in FIG. 7(A), the entire surface of the tooth 10B is formed with a curved geometry, similar effects can be obtained by rounding only the corners of a rectangular cross section of a general tooth.

As described above, in the stator core 100 of FIG. 1, the cross section of the tooth 10 perpendicular to the radial direction is defined so as to have the curved geometry, which can yield further increases in the coil space factor in addition to the realization of higher degree of reliability.

Finally, a forming process of the stator core 100 according to the present invention is described. All of the above-described stator cores 100, 100A, and 100B are formed of a magnetic dust core, making full use of its formability. In the forming process of such a magnetic dust core, a method is generally adopted in which a magnetic powder in which an oxide film is coated on each particle is fed into a molding die and then integrally formed into a desired shape through pressure forming. This forming method applied to the stator core 100 according to the present invention is shown in FIG. 8.

Figure 8:
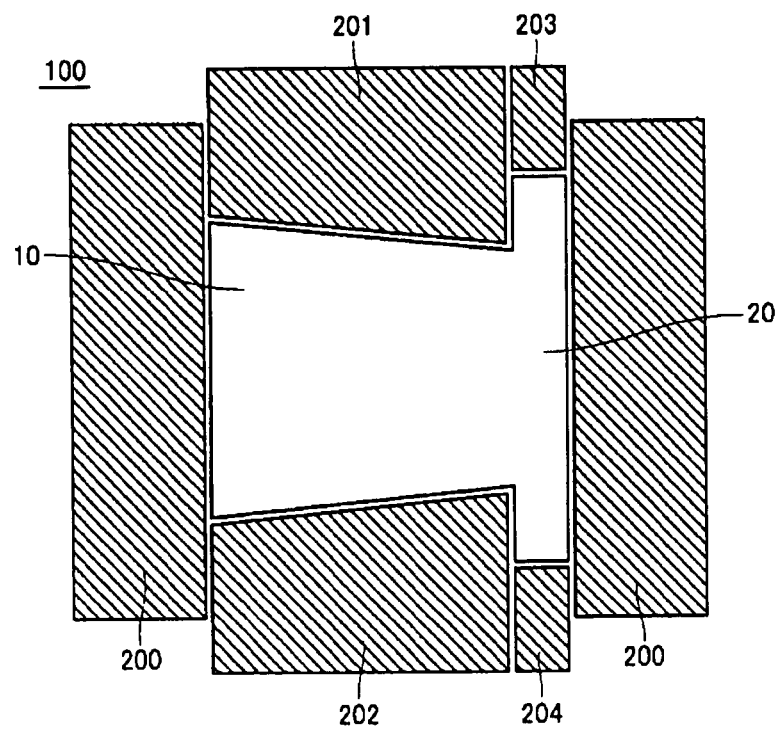
FIG. 8 is a diagram showing a forming process of a stator core in which a general forming method is employed.

FIG. 8 is a diagram showing the forming process of the stator core 100 in an example wherein a general forming method is adopted.

Referring to FIG. 8, after each particle is coated with the oxide film, the magnetic powder is filled in a die 200 functioning as a molding die. Then, the filled magnetic powder is pressed along a vertical direction by means of punches 201, 203 located upward from the die 200 and punches 202, 204 located downward from the die 200. It should be noted that the pressing direction in FIG. 8 matches the axial direction of the formed stator core 100. Thus, the stator core 100 is integrally formed.

Here, in the forming process of the magnetic dust core shown in FIG. 8, the punches 201, 203 located upward from the die 200 are composed of two punches, which are the punch 203 for forming the yoke part 20 through pressurization and the punch 201 for forming the tooth 10 through pressurization. Similarly, below the die 200, the punch 204 for forming the yoke part 20 and the punch 202 for forming the tooth 10 are provided. In other words, the yoke part 20 and the tooth 10 are individually pressed and formed by mutually different pressurization means.

The punches 201 to 204 located upward and downward from the die 200 are formed as divided separate components as described above because the tooth 10 has cross sections modified along the radial direction in the stator core 100 according to the present invention.

Specifically, when the upward and downward punches 201 to 204 are composed of a single upward punch and a single downward punch, respectively, the magnetic powder that constitutes both the tooth 10 and the yoke part 20 is uniformly pressed with a predetermined stroke (a travel amount) specified to the single punches. Then, because the axial length of the tooth 10 is gradually shortened toward the outer circumference side of the stator, the pressure applied to the magnetic powder that constitutes the tooth 10 in a pressing process becomes uneven in the radial direction, causing the pressure applied to the inner circumference side of the stator to become higher than that applied to the outer circumference side of the stator. Therefore, the magnetic powder which should constitute the tooth 10 instead leaks out from the outer circumference side of the stator having a lower pressure into the yoke part 20. As a result, the density of the magnetic powder in the pressed and molded stator core 100 is unbalanced in such a manner that the density of the tooth 10 becomes relatively lower at the inner circumference side of the stator and becomes relatively higher at both the outer circumference side of the stator and the yoke part 20.

Such an uneven density of the magnetic powder will impair overall strength of the stator core 100. In particular, there is a danger of cracks appearing in a neck of the stator core 100 being a joint part between the yoke part 20 and the tooth 10. Further, a motor generator in which a stator configured by winding coils around the teeth 10 is mounted may have a problem that desired motor performance cannot be obtained due to uneven magnetic flux generated inside the stator core 100.

Hence, as a means for addressing such unevenness of the magnetic powder density, the single-unit punch is divided into the punch 201, 202 for forming the tooth 10 and the punch 203, 204 for forming the yoke part 20 to perform independent pressure control using the divided punches. In conjunction with this configuration, the strokes of the punch 201 and the punch 203 located upward from the die 200 are independently controlled to form the magnetic powder into a molded body at a uniform density. Similarly, the stroke of the punch 202 located downward from the die 200 is controlled independently of that of the punch 204 located downward from the die 200. In other words, independent control of the strokes of the total four punches 201 to 204 enables formation of a molded body having a uniform magnetic powder density.

However, in application of such pressurization control to an actual forming process, because the independent stroke control of the total four punches 201 to 204 increases the degree of freedom in the pressurization control to 4, there arises a new problem that the control becomes complicated. As a result, manufacturing costs are increased, leading to reduced productivity. Thus, it is desired in terms of improvement in productivity that the degree of freedom in pressurization control be suppressed to the extent possible.

In addition, the motor generator in which the stator core 100 formed through the above-described pressurization control has another problem that a great amount of cost is needed in the event of making design changes to obtain a desired output torque matching with particular uses. More specifically, as a means for increasing output power of a motor generator, it is generally attempted that the number of turns of the coil wound around the stator core is increased, or the cross-sectional area of the tooth perpendicular to the radial direction is extended, to thereby increase magnetic fluxes generated in the tooth. Here, in order to increase the cross-sectional area of the tooth 10 perpendicular to the radial direction in the integrally formed stator core 100 shown in FIG. 8, it becomes necessary to prepare another molding die of a greater size. Namely, the motor generator in which the integrally molded stator core 100 is employed needs various types of molding dies for offering a wide range of output torque variations, which causes a necessary cost for making design changes to increase.

Therefore, in the present invention, as a means for enhancing productivity of the stator core 100, a structure is adopted in which the integral stator core 100 is composed of multiple molded bodies of the magnetic dust cores. The stator core 100 described below is also referred to as a split stator core 100 as distinguished from the integrally molded stator core 100 shown in FIG. 8.

Figure 9:
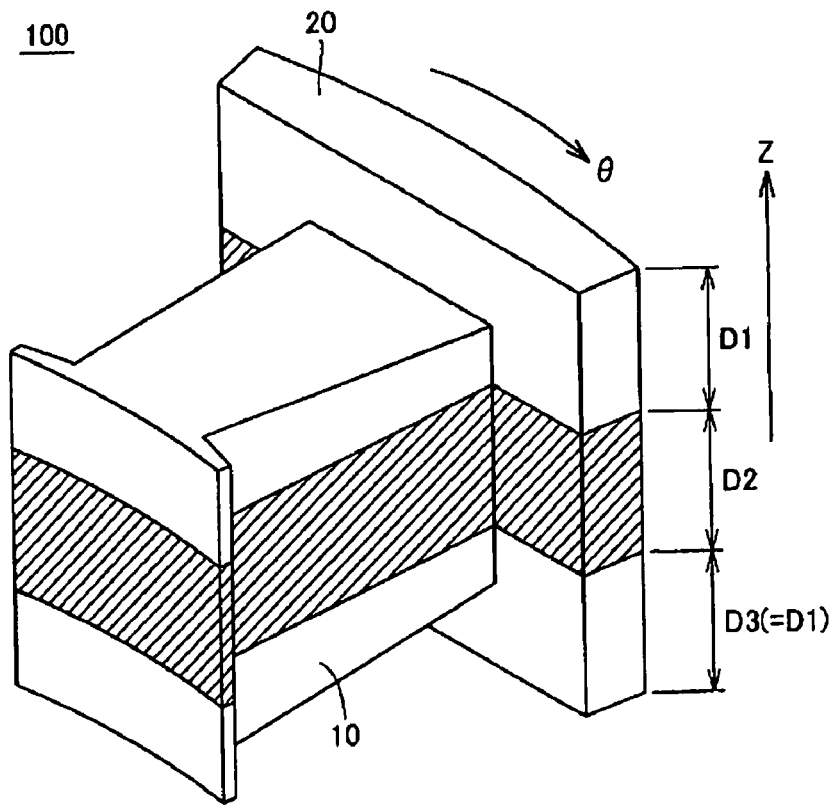
FIG. 9 is a perspective view showing one pole of the stator core in the motor generator according to the present invention.
Figure 10:
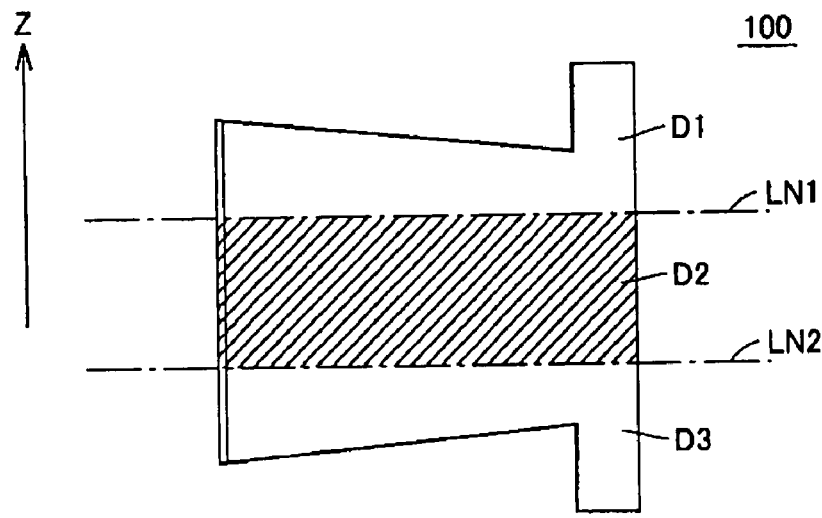
FIG. 10 is an axial cross-sectional view of the stator core in FIG. 9.

FIG. 9 is a perspective view of one pole of the stator core 100 in the motor generator according to this invention. Further, FIG. 10 is an axial cross-sectional view of the stator core 100 of FIG. 9.

Referring to FIG. 9, the stator core 100 consists of three molded bodies D1 to D3 joined along the axial direction (z direction). Among the molded bodies D1 to D3, the molded bodies D1 and D3 respectively located at either axial end are formed in the same shape, and have a horizontal surface on one end in a direction perpendicular to the axial direction (corresponding to an opposite end face relative to the axial end face). On the other hand, in the molded body D2 sandwiched between the molded bodies D1 and D3, as shown by the hatched region in FIG. 10, one end face in a direction perpendicular to the axial direction (an end face including a line LN1) is parallel to the other end face (an end face including a line LN2). That is, the stator core 100 is composed of two molded bodies D1 (=D3) and D2 of different shapes which are joined along the axial direction.

Figure 11:
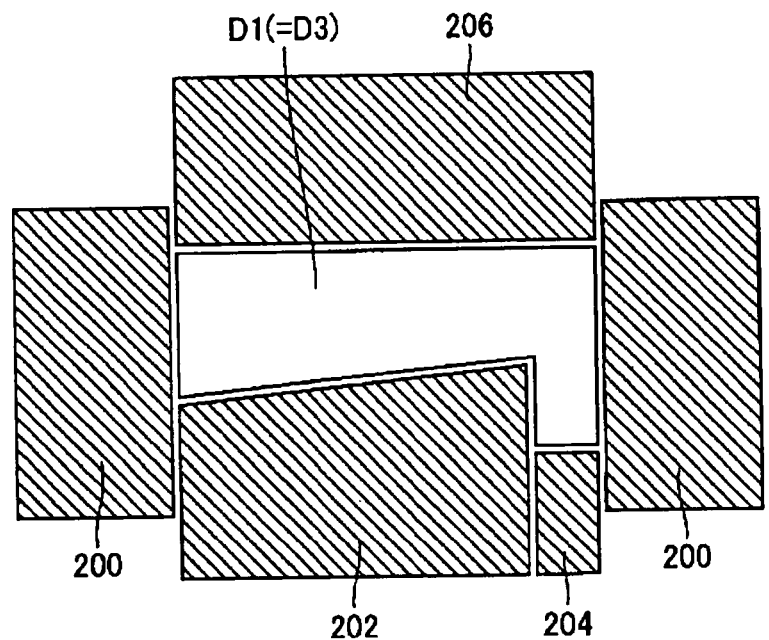
FIG. 11 is a diagram for explaining a forming process of a molded body D1 (=D3).

Next, a process for forming the molded bodies D1 to D3 will be described. FIG. 11 is a diagram for explaining the forming process of the molded body D1 (=D3).

Referring to FIG. 11, the molded body D1 is formed by pressing the magnetic powder filled in the die 200 along the vertical direction by means of a punch 206 located upward from the die 200 and punches 202 and 204 located downward from the die 200. Here, as can be seen from FIG. 11, the end face of the molded body D1 that constitutes the horizontal surface is pressed by the single punch 206, while the other end face of the molded body D1 is pressed by both the punch 202 for forming the tooth 10 and the punch 204 for forming the yoke part 20. Then, the punches 202 and 204 are independently controlled with respect to their strokes to form the magnetic powder into the molded body D1 at a uniform density. In other words, the degree of freedom in pressurization control is three in the forming process of the molded body D1. Because this degree of freedom is lower than the four degrees of freedom in the forming process of the integrally molded stator core 100 shown in FIG. 8, it becomes evident that the pressurization control is extremely simplified.

Figure 12:
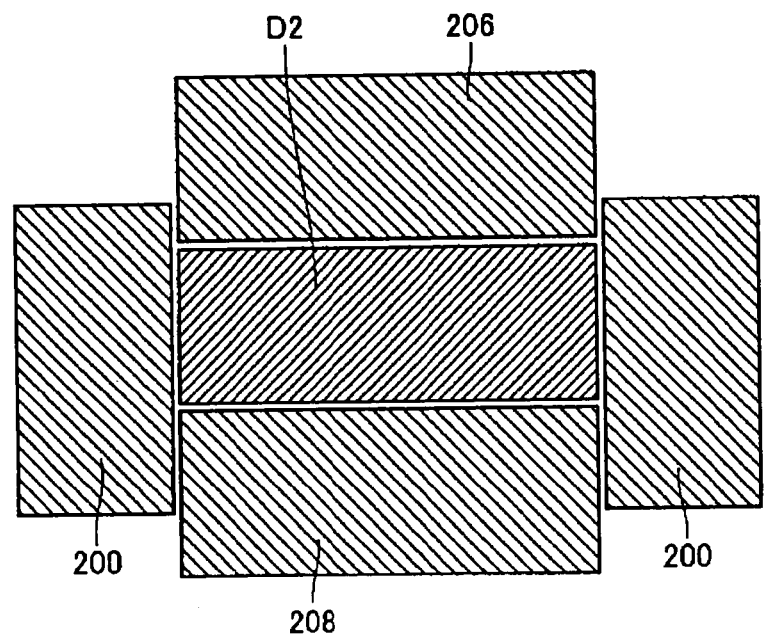
FIG. 12 is a diagram for explaining a forming process of a molded body D2.

FIG. 12 is a diagram for explaining a process for forming the molded body D2.

Referring to FIG. 12, the molded body D2 is formed by vertically pressing the magnetic powder filled in the die 200 using punches 206 and 208 located above and below the die 200. Here, because the molded body D2 has two axial end faces which are horizontal surfaces, both of the axial end faces are pressed by a single punch. Namely, because the degree of freedom in pressurization control is of a low value of two in the forming process of the molded body D2, the molded body D2 can be easily formed. Further, the axial length can be changed in an easy way of adjusting the strokes of the upward and downward punches 206 and 208.

Then, the molded bodies D1 to D3 formed in the forming processes shown in FIGS. 11 and 12 are combined along the axial direction into one integrated piece to form the stator core 100. It should be noted that integration of the molded bodies D1, D2 and D3 is performed by, for example, press-fitting the molded bodies D1, D2 and D3 as single piece into a housing which is a casing member of the motor generator, or by winding the coil around the tooth 10 in the stator core 100 consisting of the molded bodies D1, D2 and D3.

As described above, because, in the stator core 100 according to this invention, the degree of freedom in pressurization control is reduced by adopting the split stator core, and the manufacturing cost can be prevented from increasing, thereby enabling improvement in productivity.

In addition, the stator core 100 of this invention enables the cost associated with design changes regarding the output torque of the motor generator to be reduced significantly, as described below.

Figure 13:
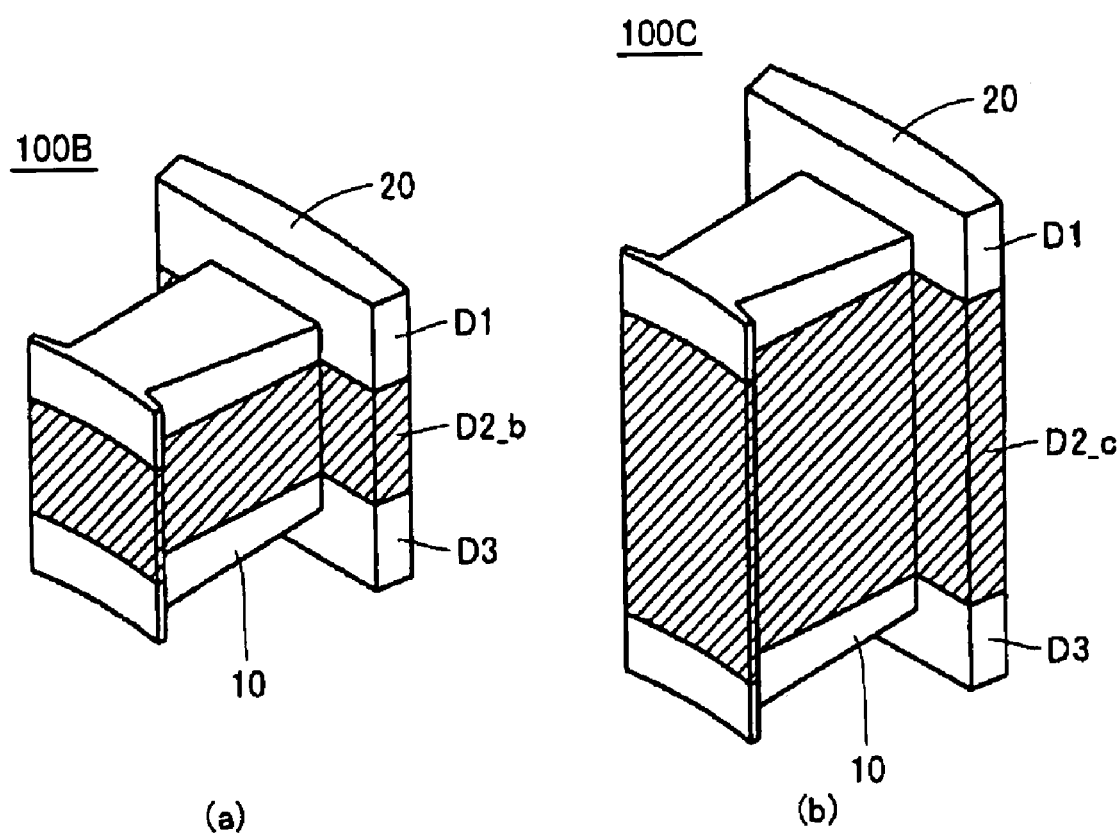
FIG. 13 is a perspective view showing one pole of stator cores in motor generators having different output torques.

For example, two stator cores 100B (refer to FIG. 13(a)) and 100C (refer to FIG. 13(b)), in which the cross-sectional areas of the tooth 10 perpendicular to the radial direction differ from each other as shown in FIG. 13, can be formed via an easy and low-cost process because it is not necessary to prepare molding dies of different sizes.

More specifically, the tooth 10 in the stator core 100B which is to be mounted in a motor generator whose output torque is relatively low has relatively smaller cross sectional areas perpendicular to the radial direction. On the other hand, the tooth 10 in the stator core 100C which is to be mounted in a motor generator whose output torque is relatively high has relatively larger cross sectional areas perpendicular to the radial direction. According to the present invention, for the stator cores 100B and 100C differing in cross sectional areas along the radial direction from each other are configured by commonly using the molded bodies D1 and D3 located at both axial ends, and respectively using molded bodies D2_b and D2_c having modified axial lengths. Modification of the axial lengths of the molded bodies D2_b and D2_c can be easily made by adjusting the strokes of the punches 206 and 208 in the above-described forming process shown in FIG. 12. Alternatively, the modification may be made in such a manner that, taking a molded body D2 having a predetermined axial length as one unit, the number of units is specified to obtain a desired axial length.

Namely, because a plurality of easily-formable molded bodies are joined to constitute the integral stator core 100, the degree of freedom of movement during pressurization control in the forming process can be minimized, to thereby enhance productivity. In addition, motor generators having a wide variety of output performances can be realized, without incurring extra costs for design changes of the stator core 100.

The embodiments disclosed here have been provided as illustrative examples in every respect, and should not be regarded as being provided to impose limitations. It is intended that the scope of the invention be defined by the following claims, and that all modifications made within the scope of the claims and their equivalents are contained in this invention.

INDUSTRIAL APPLICABILITY

The present invention may be applied to motor generators and automobiles in which a motor generator is mounted as a power source.

What is claimed is:

1. A motor generator comprising:
a stator, formed in a hollow cylindrical shape, and
a rotor rotatably mounted with respect to the stator,
the stator comprising,
a stator core including a yoke part which is annularly extended and a teeth part which has a plurality of teeth annularly disposed on an inner circumference side of the yoke part so as to point inward along a radial direction, and
a coil wound around each of the plurality of teeth;
the yoke part comprising,
a protrusion that protrudes from each axial end face of the plurality of teeth towards an outside along an axial direction, wherein
each of the plurality of teeth has an axial length which gradually decreases towards yoke part side being an outside along the radial direction, and a circumferential length which gradually increases towards yoke part side being an outside along the radial direction, each of the plurality of teeth has cross sections perpendicular to the radial direction which are substantially equal in areas along the radial direction and the area of a cross section of the yoke part perpendicular to the circumferential direction is one-half the area of the cross section of the tooth perpendicular to the radial direction, or greater.

2. The motor generator according to claim 1, wherein an axial length of the protrusion is substantially equal to an axial length of a coil end part of the coil at its outermost circumference.

3. The motor generator according to claim 2, wherein the stator has, in any one of cross sections perpendicular to the radial direction, a gap between an axial end face of the yoke part and the axial end face of the tooth which is substantially equal to the axial length of the coil end part.

4. The motor generator according to claim 1, wherein a cross-sectional area of a junction between the yoke part and each of the plurality of teeth is greater than or equal to the area of the cross section of each tooth perpendicular to the radial direction.

5. The motor generator according to claim 4, wherein each of the plurality of teeth has, in cross sections perpendicular to the radial direction, corners which are formed with curved geometries.

6. The motor generator according to claim 4, wherein each of the plurality of teeth has axial end faces which are formed with a curved shape.

7. The motor generator according to claim 1, wherein the stator core is composed of a molded body constituting a magnetic dust core.

8. The motor generator according to claim 7, wherein the stator core is composed of at least two molded bodies constituting magnetic dust cores divided along the axial direction.

9. The motor generator according to claim 8, wherein
the at least two molded bodies constituting the magnetic dust cores comprise a first molded body located at one axial end and a second molded body located the other axial end; and
at least one of the first and second molded bodies is formed into a shape identical to those of the first or second molded bodies used for a plurality of motor generators which having different axial length of the stator cores mounted therein.

10. An automobile comprising:
a wheel, and
a plurality of motor generators according to claim 9, each of the motor generators driving the wheel.

11. An automobile comprising:
a wheel, and
motor generators according to claim 1, each of the motor generators driving the wheel.

12. A motor generator comprising:
a stator formed in a hollow cylindrical shape, and
a rotor rotatably mounted with respect to the stator;
the stator comprising,
a stator core composed of a yoke part which is annularly extended and a teeth part which has a plurality of teeth annularly disposed on an inner circumference side of the yoke part so as to point inward along a radial direction, and
a coil wound around each of the plurality of teeth, wherein
the yoke part has a protrusion protruding from each axial end face of the plurality of teeth towards an outside along an axial direction, and
each of the plurality of teeth has an axial length which is longer than its circumferential length at an end of the inner circumference side of the stator core, the circumferential length being longer than the axial length at yoke part side being an end of an outer circumference side of the stator core, each of the plurality of teeth has cross sections perpendicular to the radial direction which are substantially equal in areas along the radial direction and the area of a cross section of the yoke part perpendicular to the circumferential direction is one-half the area of the cross section of the tooth perpendicular to the radial direction, or greater.

13. The motor generator according to claim 12, wherein an axial length of the protrusion is substantially equal to an axial length of a coil end part of the coil at its outermost circumference.

14. The motor generator according to claim 13, wherein the stator has, in any one of cross sections perpendicular to the radial direction, a gap between an axial end face of the yoke part and the axial end face of the tooth which is substantially equal to the axial length of the coil end part.

15. The motor generator according to claim 12, wherein a cross-sectional area of a junction between the yoke part and each of the plurality of teeth is greater than or equal to the area of the cross section of each tooth perpendicular to the radial direction.

16. The motor generator according to claim 15, wherein each of the plurality of teeth has, in cross sections perpendicular to the radial direction, corners which are formed with curved geometries.

17. The motor generator according to claim 15, wherein each of the plurality of teeth has axial end faces which are formed with a curved shape.

18. The motor generator according to claim 12, wherein the stator core is composed of a molded body constituting a magnetic dust core.

19. The motor generator according to claim 18, wherein the stator core is composed of at least two molded bodies constituting magnetic dust cores divided along the axial direction.

20. The motor generator according to claim 19, wherein
the at least two molded bodies constituting the magnetic dust cores comprise a first molded body located at one axial end and a second molded body located the other axial end; and
at least one of the first and second molded bodies is formed into a shape identical to those of the first or second molded bodies used for a plurality of motor generators which having different axial length of the stator cores mounted therein.

21. An automobile comprising:
a wheel, and
a plurality of motor generators according to claim 20, each of the motor generators driving the wheel.

22. An automobile comprising:
a wheel, and
motor generators according to claim 12, each of the motor generators driving the wheel.

* * * * *

UNITED STATES PATENT AND TRADEMARK OFFICE
CERTIFICATE OF CORRECTION

PATENT NO.        : 7,737,600 B2                                    Page 1 of 1
APPLICATION NO.   : 11/666460
DATED             : June 15, 2010
INVENTOR(S)       : Yasuhiro Endo et al.

It is certified that error appears in the above-identified patent and that said Letters Patent is hereby corrected as shown below:

| Column | Line |  |
|---|---|---|
| 14 | 33 | After "located" insert --at--. |
| 16 | 10 | After "located" insert --at--. |

Signed and Sealed this

Fifth Day of October, 2010

David J. Kappos
*Director of the United States Patent and Trademark Office*